April 22, 1958 R. G. LAUCHER 2,831,321
VARIABLE AREA EXHAUST NOZZLE
Filed July 30, 1954 5 Sheets-Sheet 1

INVENTOR,
RICHARD G. LAUCHER
BY
R. E. Granque
ATTORNEY

April 22, 1958 R. G. LAUCHER 2,831,321
VARIABLE AREA EXHAUST NOZZLE
Filed July 30, 1954 5 Sheets-Sheet 2

INVENTOR.
RICHARD G. LAUCHER
BY R. E. Geauque
ATTORNEY

April 22, 1958 R. G. LAUCHER 2,831,321
VARIABLE AREA EXHAUST NOZZLE
Filed July 30, 1954 5 Sheets-Sheet 3

INVENTOR,
RICHARD G. LAUCHER
BY R. E. Geangue
ATTORNEY

April 22, 1958 R. G. LAUCHER 2,831,321
VARIABLE AREA EXHAUST NOZZLE
Filed July 30, 1954 5 Sheets-Sheet 4

INVENTOR.
RICHARD G. LAUCHER
BY R. E. Geauque
ATTORNEY

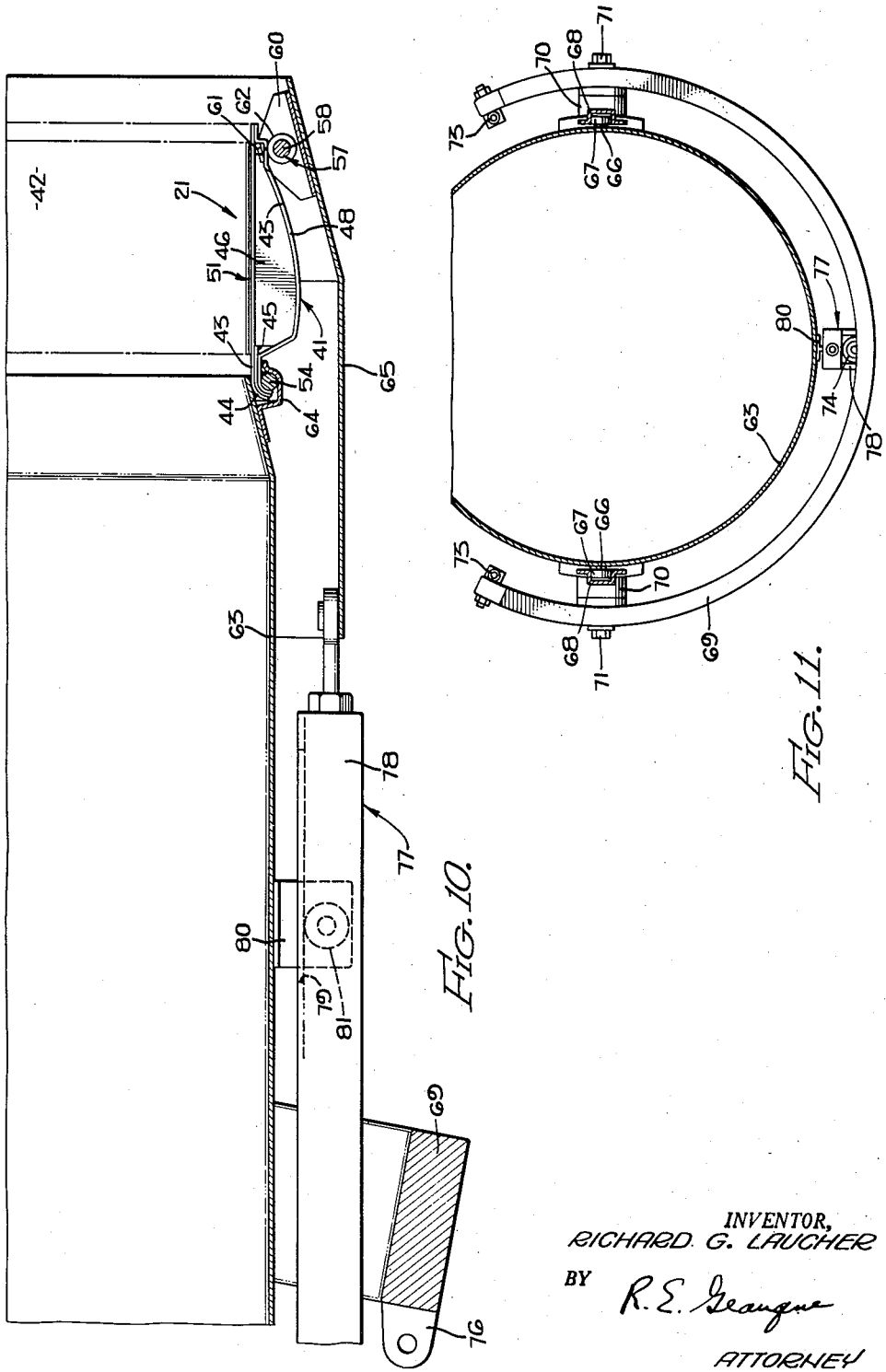

United States Patent Office 2,831,321
Patented Apr. 22, 1958

2,831,321

VARIABLE AREA EXHAUST NOZZLE

Richard G. Laucher, Canoga Park, Calif., assignor to Marquardt Aircraft Co., Van Nuys, Calif., a corporation of California Application July 30, 1954, Serial No. 446,805

4 Claims. (Cl. 60—35.6)

The present invention relates to means for controlling the exhaust exit area of a turbo jet engine and more particularly to a variable exit nozzle for effecting optimum performance of a turbo jet engine.

It has been found that where afterburning or water injection is used for thrust augmentation, a variable exit nozzle is necessary to provide the desired turbine temperature and pressure conditions under both normal and augmented engine operation. Also, since the exit area of a nozzle of this type can be varied, the use of such a nozzle permits maximum thrust to be obtained from an engine for take-off purposes, independently of ambient temperature. A nozzle of this type permits the maximum power to be drawn from an engine over the wide range of engine inlet conditions arising from present day airplane operational speeds and altitudes and makes it possible to obtain more rapid changes in thrust in an emergency. With a turbo jet having a fixed exit exhaust area, increased thrust is obtained by increasing the engine R. P. M. and a considerable time interval is required to accelerate or decelerate the engine because of the high inertia of the rotor. With a turbo jet equipped with a variable exit nozzle, however, the thrust of the engine can be reduced as much as fifty percent while still maintaining full engine R. P. M. and a reduction of the nozzle area effects an immediate increase in thrust in an emergency without the relative slow acceleration of the engine rotor. Cooler engine starts, more rapid acceleration to operational engine speeds, and compensation for thrust variations between individual engines in a multi-engine aircraft are further advantages of turbo jet engines equipped with variable nozzles.

An object of the present invention therefore, is to provide a variable exit nozzle for increasing the efficiency and operation of a turbo jet engine.

Another object of the present invention contemplates an iris-type nozzle in combination with a unison ring construction for effecting changes in the exit nozzle area upon relative axial movement of one of the members with respect to the other.

A further object is to provide a multi-segment nozzle which effects area change through iris-like movement of the individual segments in unison.

A still further object is to provide sealing plates for interconnecting the individual segments of a multi-segment nozzle which effect good sealing against gas leaks and which permit iris-like movements of the segments while still sealing the spaces therebetween.

Another object is the provision of a variable exit nozzle which is structurally strong, which is relatively simple in design, light in weight and resistant to augmentation temperatures.

Further objects of the present invention will be readily apparent to those familiar with the art upon perusal of the following description in conjunction with the accompanying drawings, in which:

Figure 3 is a cross sectional view taken on the line 3—3 of Figure 1, with a portion cut away.

Figure 10 is a vertical sectional view of the combination shown in Figure 9 with parts removed and slightly enlarged.

Figure 11 is a cross sectional view of the combination shown in Figure 9 taken on the line 11—11 of Figure 9.

Figure 1:
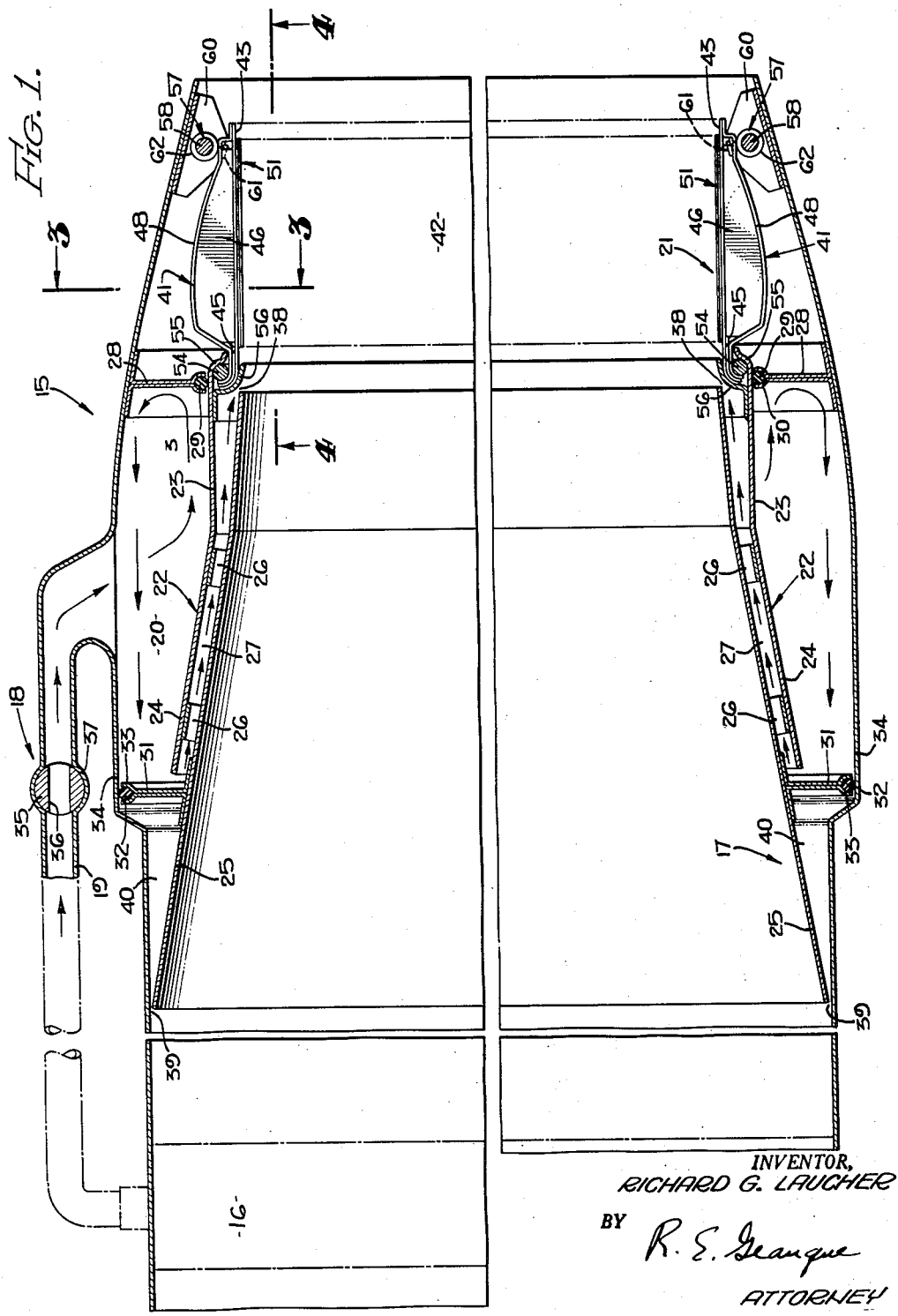
Figure 1 is a longitudinal cross sectional view of a turbo jet engine, only the rear portion being shown, showing the variable exit nozzle of the present invention in its maximum expanded position with parts broken away to show details of construction.

Referring to Figure 1 of the drawings, reference number 15 represents the exhaust end of a turbo jet engine of any well-known or suitable construction, the specific details of the engine, except for a compressor 16, shown diagrammatically, not being visible and forming no part of the present invention. The exhaust end of the engine is in the form of a sheet metal casing and received in the casing and movable fore and aft with respect thereto is a variable position nozzle control designated broadly as 17. The variable position nozzle control is air actuated and responsive to the position of a valve 18 which is positioned in a bleed line 19, the bleed line interconnecting the compressor 16 with an actuating chamber 20 as will be more fully appreciated hereinafter.

The nozzle control 17 consists of a multi-segment iris-type nozzle 21 swingably connected to the rearward end of a tubular-shaped supporting member 22. The member 22 has a cylindrical portion 23 which is of substantially equal diameter and an outwardly flaring funnel portion 24 which extends forwardly therefrom. The supporting member 22 receives therein a sheet metal truncated cone 25 which is fixed in predetermined spaced relationship to the support 22 by means of suitable clips 26, each clip being spot welded to the portion 24 and to the truncated cone 25 so as to form a passageway 27 therebetween. A diaphragm 28 is fixed as by welding to the inner circumference of the casing 15 and carries adjacent its inner circumference a suitable seal 29 in a formed cup-shaped portion 30. The portion 23 of support 22 is supported by the diaphragm 28 and the seal 29 permits fore and aft movement of the support 22 with respect thereto while preventing the escape of compressed air from chamber 20 as will be more fully appreciated hereinafter. A diaphragm 31 is fixed as by welding to the outer circumference of cone 25 forwardly of support 22 and a seal 32 is carried in a formed cup-shaped portion 33 at the outer circumference of the diaphragm. The diaphragm is so located that the seal 32 is in sealing relationship to a cylindrical wall portion 34 of casing 15 while still permitting a fore and aft movement of diaphragm 31 relative to wall 34.

The air actuating chamber 20 is interconnected to compressor 16 by bleed line 19 as previously suggested. The valve 18 can be of any suitable or well known construction and preferably comprises a cylindrical portion 35 which has formed therein a valve port 36 which upon portion 35 being moved into the position shown in Figure 1 permits the compressed air to flow from the compressor into the chamber 20 and which upon being moved into position shown in Figure 2 interrupts the flow of compressed air into chamber 20. The cylindrical portion 35 is rotatively received in a formed section 37 of bleed line 19 and is responsive to suitable controls positioned within easy reach of an operator in any suitable manner. With the valve positioned as shown in Figure 1, the compressed air flowing into chamber 20 by way of bleed line 19 reacts against diaphragm 31 and the surfaces of cone 25 and member 22 so as to move the nozzle control 17 forwardly relative to the casing 15 when the pressure in chamber 20 reaches a predetermined amount. The air in the actuating chamber 20 flows through passageway 27 into the interior of the nozzle control 17 through an orifice 38. The air passing through the chamber 20 and the passageway 27 cools this part of the combustion chamber and the orifice 38 acts as a restriction for raising the pressure of the air in chamber 20. If afterburning is not utilized by the engine, the pasageway 27 could be eliminated, in which case the valve 18 would comprise a two-way valve for connecting space 20 either to the compressor or to atmosphere.

Figure 2:
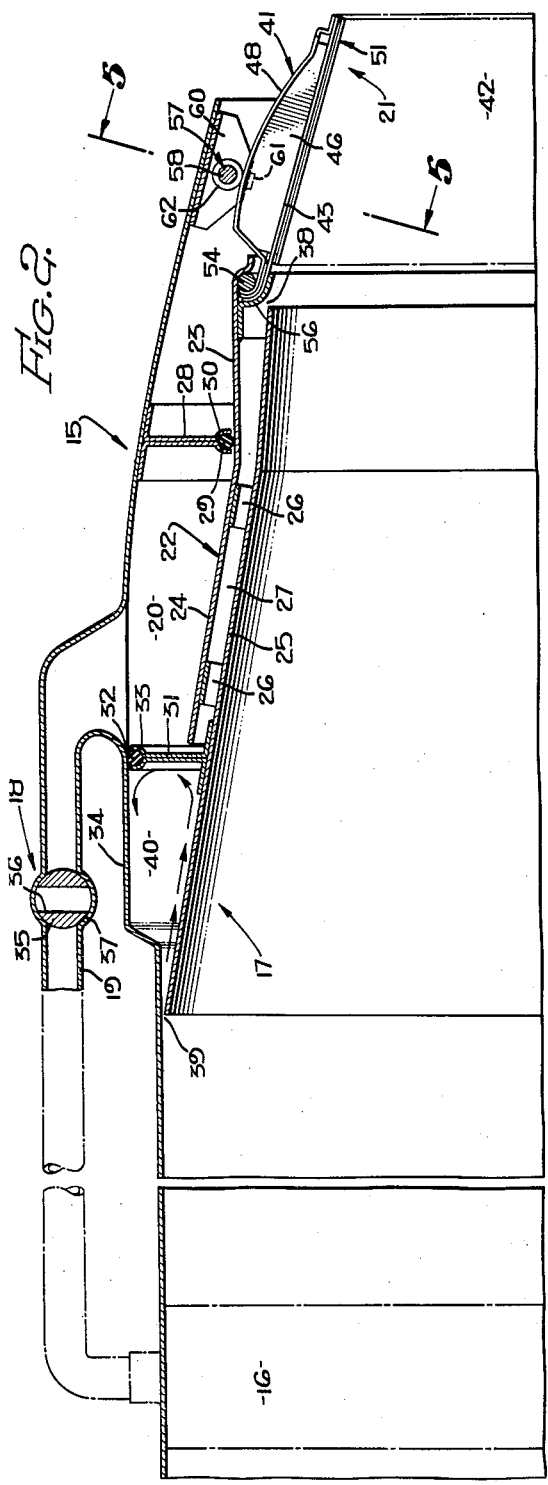
Figure 2 is a view similar to Figure 1, with parts broken away, showing the variable exit nozzle in its maximum contracted position.

When the valve 18 is closed as shown in Figure 2 the air flowing through chamber 20 is cut off. The forward end of sheet-metal truncated cone 25 is spaced from the interior circumferential surface of the casing 15 sufficiently to form an orifice 39. The combustion air enters a chamber 40 by way of orifice 39 permitting therefore the internal combustion chamber pressure therein to act against the diaphragm 31. Inasmuch as the pressure in chamber 40 is greater than the air pressure in chamber 20 leaking through orifice 38 when the valve 18 is closed, the nozzle control 17 is caused to move rearwardly relative to casing 15 into the position shown in Figure 2. The combustion air acting against the entire inner circumferential surface of the cone 25 also tends to urge the nozzle control 17 to move rearwardly.

It will be appreciated, therefore, that the nozzle control 17 is air actuated into either its maximum forward position or its maximum rearward position relative to casing 15 and that the position of control 17 is under direct control of valve 18 which in turn is under direct control of an operator as previously suggested. It will also be appreciated that the valve 18 could be replaced with a suitable modulating valve for multi-positioning the nozzle control 17 relative to the engine casing 15. By utilizing the cone 25 and member 22 to actuate the nozzle, an annular actuating chamber 20 with large diaphragm areas is provided without appreciably increasing the frontal area of the engine, as results when external actuating pistons and the like are positioned exterior of the engine. The large diaphragm area permits the use of relatively low fluid pressures, such as readily available bleed air from the compressor, for actuation of the nozzle, thus eliminating the need for complex, heavy hydraulic and electric nozzle actuation mechanism. It is apparent that the projected area of cone 25, as well as the area of diaphragm 31 is effective for nozzle actuation.

Figure 6:
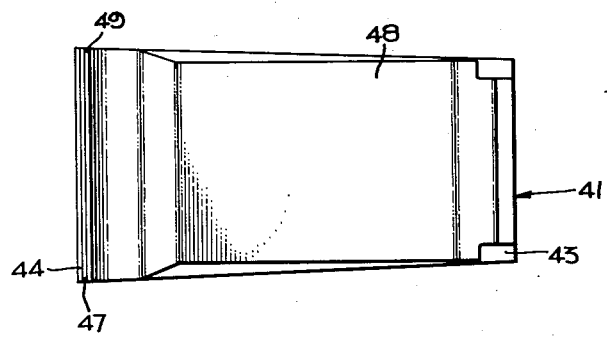
Figure 6 is a plan view of an individual segment of the multi-segment nozzle, slightly enlarged.
Figure 7:
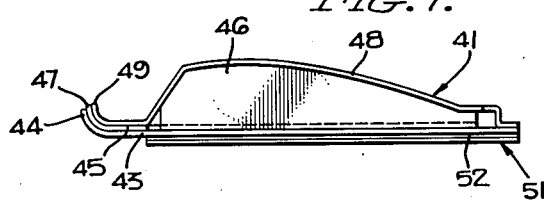
Figure 7 is a side elevational view of the segment shown in Figure 6.
Figure 8:
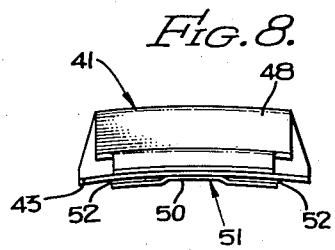
Figure 8 is a rear elevational view of the segment shown in Figure 6.

The iris-type nozzle 21 is fabricated from a plurality of segments 41 which effect iris-like movements in response to the fore and aft movement of nozzle control 17 for changing the discharge area of the nozzle exit opening 42. Each of these segments 41 is fabricated from suitable sheet metal which comprises a base plate 43 having a forwardly positioned curled portion 44, see Figures 6, 7 and 8. A reinforcing member 45 is welded to the base 43 and has a pair of upwardly extending spaced supporting webs 46 and a forwardly positioned curled portion 47. A cam plate 48 is fixed to the rear of base 43 as by welding and is shaped to fit against the top of the supporting webs 46, a curled portion 49 being provided shaped to fit in curled portion 47. The curled portions of each of the elements are welded together so as to form a unitary structure of great strength while still being relatively easy and inexpensive to manufacture. A channel portion 50 of a butterfly plate 51 is welded to the underside of base 43 and provides a pair of slides 52 for slidably supporting therein one edge of a suitable sealing plate 53. It will be appreciated that when the nozzle 21 is caused to move from a substantially closed position to a substantially open position, that the ends of each of the segments are caused to be moved circumferentially with respect to its adjacent segments. To seal the space between adjacent segments while still allowing the space therebetween to vary as the area of the discharge opening is changed, sealing plates 53 which in the present instance are substantially T-shaped, are slidably received in adjacent slides 52 of adjacent segments. The sealing plates 53 and the slides 42 of each of the segments are so designed that the space between adjacent segments at all times remains sealed regardless of whether the nozzle 21 is in its maximum opened position or in its maximum closed position.

The individual segments are spaced about the inner circumference of a hinge seal 54, the seal being received in the curled portion 49 of each of the segments 22. The rearward end of a support member 22 is curved inwardly as at 55 and a circular shaped curved retainer 56 is fixed as by welding to the inner circumference of support 22 adjacent curved portion 55. The hinge seal 54 and the individual segments 41, the individual segments being interconnected by the sealing plates 53 in a manner as previously suggested, are received between the retainer 56 and the curved portion 55 so that the hinge seal is suitably trapped therein and the individual segments 41 are swingable with respect thereto and capable of iris-like movements upon fore and aft movement of nozzle control 17 with respect to casing 15 as will be more fully appreciated hereinafter. It will be noted that the rearward edge of curved portion 55 and bar 56 act as limit stops for swinging movements of the individual segments 41 and that sealing plates 53 are locked against forward displacement out of slides 52 by retainer 56.

Figure 5:
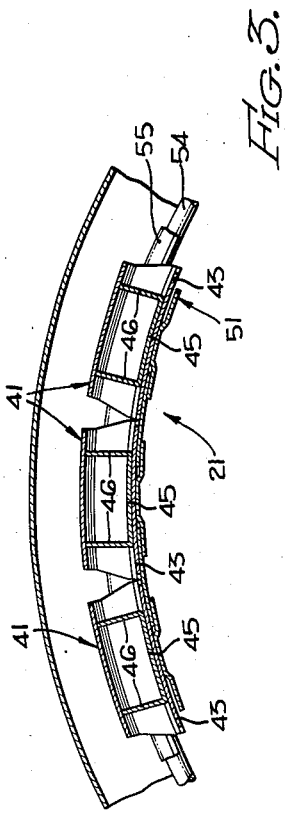
Figure 5 is a cross sectional view taken on the line 5—5 of Figure 2 with a portion cut away.
Figure 4:
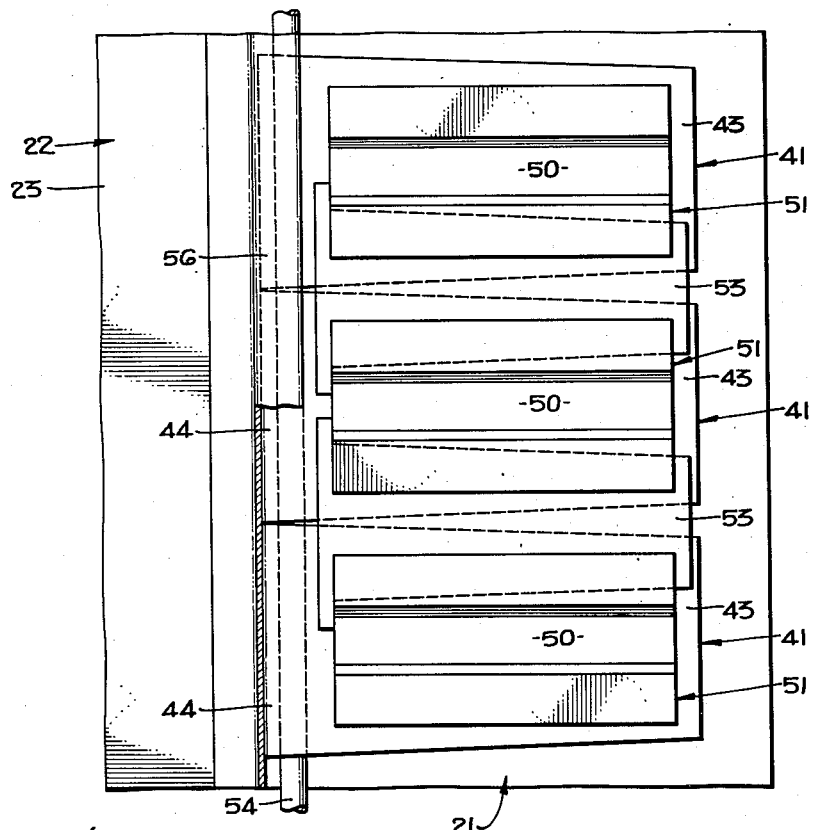
Figure 4 is a view looking in the direction of line 4—4 of Figure 1 with a portion cut away and slightly enlarged.
Figure 5:
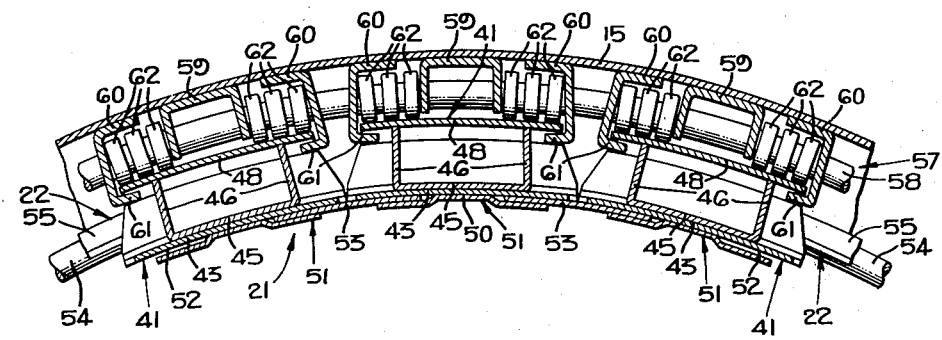

As previously suggested, the iris-type nozzle consists of a plurality of fabricated segments 41, each hinged to a hinge ring 54 and interconnected by T-shaped sealing plates 53. The sealing plates permit circumferential movement of the segments 22 relative to each other as the nozzle area is changed and expansion or contraction of the nozzle area is effected by fore and aft movement of the individual segments relative to a unison ring 57, see Figure 5.

The unison ring 57 comprises a ring member 58 which is supported from the inner circumferential surface of casing 15 by means of suitable cradles 59 and U-shaped support and guide members 60, each of the cradles 59 and the members 60 being fixed to casing 15 as by welding or the like. The members 60 are in paired relationship, one on each side of each of the cradles 59. Each of the members 60 has a portion 61 which is received under a cam plate 48 for holding each of the segments 41 in predetermined spaced position with respect to ring 57. The ring 57 rotatably supports thereon a plurality of rollers 62 between each of the members 60 and its associated cradle 59, and the rollers are positioned in rolling relationship against the cam plates 48 of segments 41. The shape of the cam plates 48 and the diameter of the unison ring 57 are so determined that the segments 41 will be urged to swing either inwardly or outwardly in unison upon relative axial movement of nozzle 21 with respect to ring 57. It will be appreciated, therefore, that as control nozzle 17 moves axially relative to casing 15 from the position shown in Figure 1 to the position shown in Figure 2, that the individual segments 41 will be caused to be moved relative to the unison ring 57 in the same direction. Therefore, inasmuch as the members 60 slidably hold the cam plate 48 of each of the segments against rollers 62, rearward movement of the segments urges the nozzle 21 to move into its closed position. When the nozzle control 17 is caused to move axially into the position shown in Figure 1, the segments 41 of the nozzle are caused to move outwardly into their open nozzle position. In operation, the combustion blast tends to swing each of the segments outwardly against the rollers 62 and the members 60 which slidably hold the cam plate 48 of each of the segments against rollers 62 are necessary only for maintaining the adjusted exit opening when the engine is not in operation.

It will be appreciated, therefore, that the jet nozzle area is under complete control of the operator by means of valve 18. It will also be appreciated that the nozzle 21 closely approximates a fixed conical converging nozzle and effects, therefore, substantially optimum performance for the pressure ranges of engines of this type. The exit nozzle is also relatively simple in design and function, light in weight, while still being structurally sound and resistant to augmentation temperature.

Figure 9:
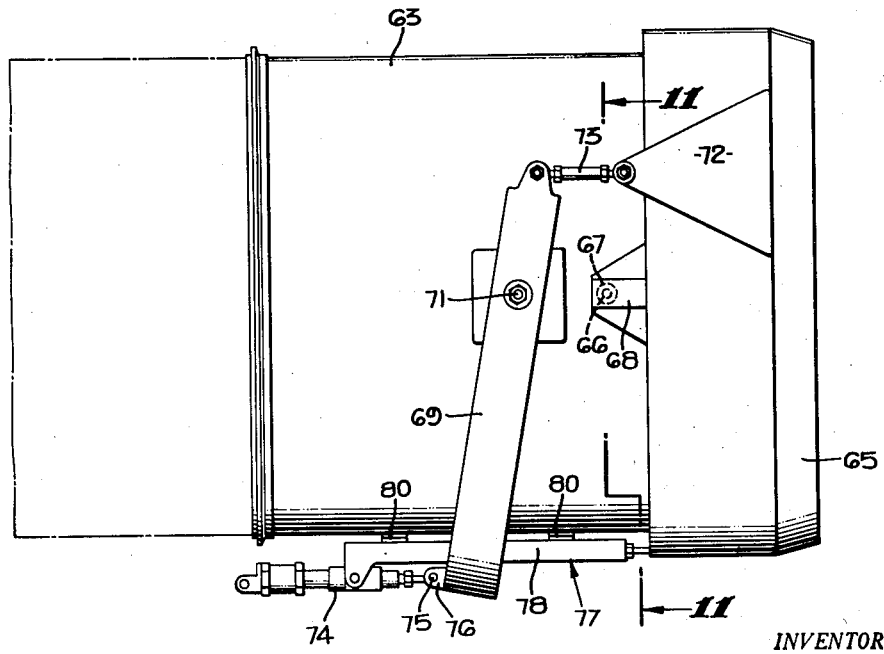
Figure 9 is a side elevational view of the exhaust end of a turbo jet engine in combination with a variable exit nozzle, showing a modification, and with parts removed.

While the nozzle 21 of the present embodiment of the invention is air actuated and movable fore and aft relative to the unison ring 54 for effecting expansion or contraction of the nozzle exit area, it is contemplated that in some installations it will be preferable to make the unison ring movable fore and aft relative to the nozzle, see Figures 9, 10 and 11. For instance, Figure 10 shows the nozzle 21 encircling the exhaust end of a turbo jet engine casing 63, a circular shaped curved retaining bar 64 being fixed as by welding to the exterior circumferential surface of casing 63 and being spaced therefrom sufficiently to receive therein the hinge ring 54 and the individual segments 41 of the nozzle 21. A tubular unison ring carrier 65 encircles the nozzle 21 and the discharge end of the casing 63, and cradles 59 and members 60 of unison ring 57 are fixed as by welding to the inner circumference of carrier 65 adjacent the rearward end thereof so as to support unison ring 57 therefrom. The portions 61 of the members 60 are positioned in sliding and guiding relationship with respect to the under surface of the cam plates 48 in a manner as previously suggested for positioning the cam plates 48 in rolling frictional relationship with respect to the rollers 62 so that fore and aft movement of the carrier 65 will effect expansion or contraction in unison of the individual segments 41 of the nozzle 21 in a manner as previously described.

The engine casing 63 has welded thereto oppositely positioned radially extending trunnions 66 which carry adjacent the ends thereof rotatable rollers 67. A pair of guide channels 68 are welded to the inner circumference of the carrier 65 in opposite positions and in parallel relationship with respect to the axis of carrier 65, and the channels 68 are so spaced as to receive therein the rollers 67. It will be appreciated that carrier 65 is thereby supported for relative fore and aft movement with respect to nozzle 21.

For effecting axial movement of the carrier 65 relative to nozzle 21, a yoke 69 is rockably supported from spacers 70 for fore and aft swinging movement about the axis of bolts 71, spacers 70 being fixed to casing 63 as by welding or the like. The opposite ends of the yoke 69 are each connected to a suitable clevis 72 fixed to carrier 65 by means of a suitable link 73, the links 73 being in the form of turn buckles for adjustment purposes as will be more fully appreciated hereinafter. It will be noted that the carrier 65 will be caused to move forwardly relative to nozzle 21 on rollers 67 upon yoke 69 being rocked in one direction and rearwardly on rollers 67 upon yoke 69 being rocked in the other direction.

A lineal power transmitting device such as a servomotor 74 of any suitable or well known construction is provided for rocking the yoke 69. The servomotor is anchored at one end to a suitable support, not shown in the drawings, and is connected at its other end by means of a pin 75 to a clevis 76 of yoke 69. The servomotor is under control of the operator and exerts a lineal force against the yoke for rocking the yoke fore and aft upon being activated. A follow-up mechanism 77 is also provided for acting upon the servomotor control valve for stopping further actuation of the servomotor upon carrier 65 being moved relative to nozzle 21 to predetermined limits, either fore or aft. This mechanism can be of any suitable or well known construction and comprises in the present instance a channel-shaped member 78 which is interconnected between the servomotor and carrier 65 for movement fore and aft therewith. The member 78 is slotted as at 79 and stop members 80, depending from shroud 63 are received in slots 79. Each of members 80 carry suitable rollers 81 for supporting the member 78 for fore and aft movement thereon and member 78 is movable fore and aft relative to depending stop members 80 within the limits defined by the slots 79. It will be appreciated therefore that when the servomotor is actuated so as to rock the yoke 69 for moving carrier 65 forwardly relative to nozzle 21, the servomotor will be automatically stopped upon nozzle 21 being moved into its maximum contracted position by movement of member 78 relative to stop members 80 to its maximum position in that one direction. When the carrier 65 is moved in the other direction relative to nozzle 21, the movement of the carrier is automatically stopped upon nozzle 21 moving into its maximum expanded position by member 78 moving relative to stop members 80 its maximum distance in the other direction.

It is thought that the invention and many of its attendant advantages will be understood by the foregoing description and it will be apparent that various changes can be made without departing from the spirit and scope of the invention or sacrificing any of its material advantages.

What is claimed is:

1. In a turbo jet engine having a substantially tubular shaped discharge casing, a tubular, conical shaped nozzle control member positioned within said casing and extending axially along said casing, support means for mounting said control member for fore and aft movement relative to said casing, nozzle means carried by said control member to vary the exhaust area of said engine upon fore and aft movement of said control means, diaphragm means connected to said control member and extending between said control member and said casing, and means for applying fluid pressure to one side of said diaphragm means and to one side of the conical surface of said control member to move said control member forwardly, said control member and said diaphragm means projecting inwardly from said casing and having the other side of said diaphragm means and of the conical surface of said control member continually subjected to the exhaust pressure of said engine to move said control member rearwardly when no fluid pressure is applied by said pressure applying means.

2. In a turbo jet engine having a compressor and a substantially tubular-shaped discharge casing, a nozzle control comprising a conical shaped, tubular member located within said casing, support means secured to said casing for slidably supporting said conical member for axial movement relative to said casing, a variable area nozzle carried by said nozzle control, means carried by said casing for varying the area of said nozzle upon axial movement of said conical member, diaphragm means carried by said conical member and cooperating with said support means to provide a chamber between said conical member and said casing, and means for connecting said chamber with fluid pressure from said compressor to move said conical member forwardly, said conical member and said diaphragm means projecting inwardly from said casing and continually acted upon by the exhaust pressure of said engine to move said nozzle control rearwardly when said chamber is disconnected from said compressor.

3. In a turbo jet engine as defined in claim 2 wherein said nozzle control has a second conical shaped tubular member spaced from said first mentioned tubular member to provide an exhaust passage from said chamber, the exhaust through said passage acting to cool said first mentioned tubular member.

4. In a turbo jet engine having a compressor and a substantially tubular-shaped discharge casing, a nozzle control received in said casing, a diaphragm depending from the inner circumference of said casing and supporting said nozzle control in sealing and sliding relationship, a second diaphragm axially spaced from the first mentioned diaphragm and depending from said nozzle control and in sealing and sliding relationship with respect to the inner circumference of said casing, means for directing the compressed air of said compressor against said second diaphragm and nozzle control for shifting said nozzle control relative to said casing in one direction, means for directing the exhaust gas of said engine against said second diaphragm and nozzle control for shifting said nozzle control in the other direction, a multi-segment nozzle positioned adjacent the discharge end of said casing and movable with said nozzle control, guide means carried by said casing and encircling the individual segments of said engine for exerting a circumferential force in unison against said segments for varying the exit area of said nozzle upon relative fore-and-aft movement between said nozzle and said guide means.

References Cited in the file of this patent

UNITED STATES PATENTS

| | | |
|---|---|---|
| 186,310 | Curtis | Jan. 16, 1877 |
| 2,462,953 | Eaton et al. | Mar. 1, 1949 |
| 2,603,062 | Weiler et al. | July 15, 1952 |
| 2,637,163 | Brown et al. | May 5, 1953 |
| 2,682,147 | Ferris | June 29, 1954 |
| 2,693,078 | Laucher | Nov. 2, 1954 |
| 2,770,944 | Jordan | Nov. 20, 1956 |

FOREIGN PATENTS

| | | |
|---|---|---|
| 711,941 | Great Britain | July 14, 1954 |